Figure 1:
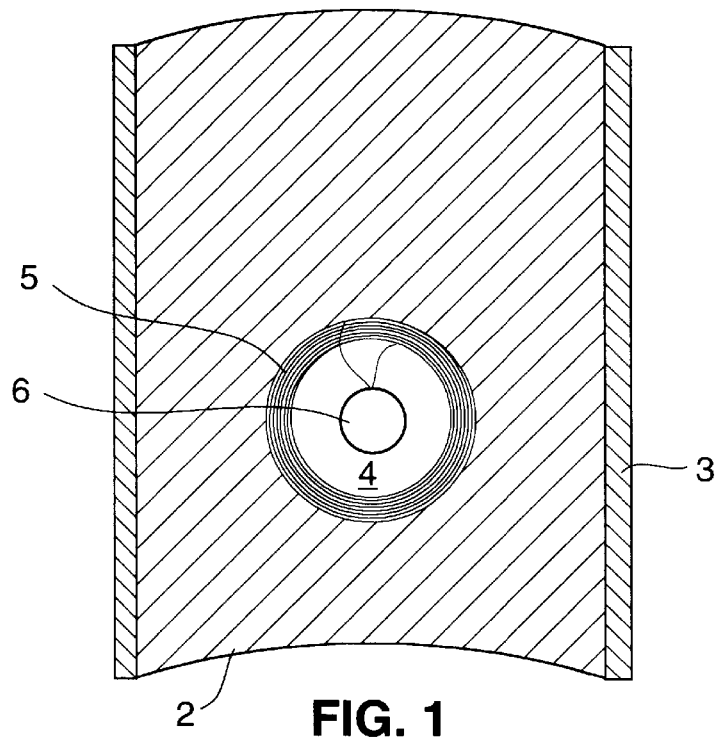

United States Patent
Hesky

[19]

[11] Patent Number: 6,112,580
[45] Date of Patent: Sep. 5, 2000

[54] DEVICE FOR DETECTING LEAKS IN PIPELINES

[75] Inventor: Michael Hesky, Villmar, Germany

[73] Assignee: Michael Hesky GmbH, Germany

[21] Appl. No.: 09/117,896

[22] PCT Filed: Feb. 7, 1997

[86] PCT No.: PCT/EP97/00560

§ 371 Date: Nov. 10, 1998

§ 102(e) Date: Nov. 10, 1998

[87] PCT Pub. No.: WO97/29351

PCT Pub. Date: Aug. 14, 1997

[30] Foreign Application Priority Data

Feb. 10, 1996 [DE] Germany ............................ 196 04 821

[51] Int. Cl.[7] ............................ G01N 27/82; G01R 33/12
[52] U.S. Cl. ........................ 73/49.1; 73/40.5 R; 324/220; 324/240; 324/243
[58] Field of Search ............................ 73/40.5 R, 40.5 A, 73/41.1; 324/220, 226, 227, 240, 242, 243

[56] References Cited

U.S. PATENT DOCUMENTS

| | | | |
|---|---|---|---|
| 4,377,733 | 3/1983 | Yamaguchi et al. | |
| 4,843,319 | 6/1989 | Lara | 324/240 |
| 4,843,320 | 6/1989 | Spies | 324/240 |
| 5,030,911 | 7/1991 | Lam | 324/242 X |

FOREIGN PATENT DOCUMENTS 40 00 699  5/1991  Germany .

OTHER PUBLICATIONS

Patent Abstracts of Japan, Publication No. 62237337 dated Oct. 17, 1987, Application Date: Apr. 8, 1986 as No. 61080458 entitled Sodium Leakage Detector.

*Primary Examiner*—Daniel S. Larkin
*Attorney, Agent, or Firm*—Limbach & Limbach LLP

[57] ABSTRACT

Apparatus for status detection, in particular leak detection, in pipelines for the transportation of media, in particular, steam or hot water. The pipeline respectively comprises an inner medium-carrying pipe (1), an adjoining heat-insulating layer (2), and a outer protective pipe (3). Disposed in the region of the heat-insulating layer (2) is at least one sensor unit (4) with an induction coil (5) and a moisture and/or temperature dependent sensor (7). An interrogation device (20), which includes an exciter coil (25) with a transmitting device (22), a receiving device (23), and an evaluation device (24), permits interrogation of the condition of the sensor unit (4). The interrogation device can be portable, coupled to a lap-to, or can be in the form of a stationary fitment above the sensor unit (4).

13 Claims, 2 Drawing Sheets

DEVICE FOR DETECTING LEAKS IN PIPELINES

The invention concerns an apparatus for status detection, in particular leak detection, in pipelines.

In district heating installations leak signalling including leakage location is effected by means of metallic conductors which are embedded in the thermal insulation of the pipelines (DE 579 184, 637 703, 1 814 857; and 2 337 983). When a leak occurs, the location of the defect can then be found out by resistance measurement or also transit time measurement. The metallic conductors of copper or Ni/Cr are already incorporated into the thermal insulation, which generally consists of polyurethane, in the foaming operation for the production thereof, in the manufacture of the individual pipe portions ('lengths'), in which respect uniform spacings in relation to the medium-bearing pipe are to be observed in order to obtain comparable measurements. During the construction phase, not only the medium-bearing pipes and the protective or outer pipes, but also the leakage signalling conductors have to be connected together, in the region of the pipe-connection locations (sleeves or sockets).

In the case of so-called post-insulation of the connecting sleeves or sockets by the application of polyurethane foam, comparatively high temperatures and comparatively large forces occur within the foam, which in the extreme case result in the electrical connections being torn away between the signalling conductors. Then the entire pipeline region between such torn-away electrical connections ceases to be accessible for monitoring and locating operations.

In the case of pipelines which are designed for temperatures above 130 or 140° C., an insulation which consists of glass fiber cloth and which is applied directly to the medium-bearing pipe is generally used, in addition to the heat-insulating layer of polyurethane. When a leak occurs, the hot water which has passed therethrough can then very rapidly be propagated in the longitudinal direction so that in a few minutes pipeline portions of several hundred meters in length are flooded. Leak signalling in such a situation then only indicates that the entire pipeline length involved has to be renewed.

Accordingly, the object of the present invention is to provide an apparatus for leak detection and location, which avoids the problems with leak signalling conductors in the thermal insulation and which permits leakage points or regions to be reliably and accurately located.

As a sensor unit with an induction coil operates in a passive mode, there is no need for any installed power source, for example in the form of a battery. In addition, a plurality of sensor units which are distributed over a pipe run length do not have to be connected together by way of lines which run in the thermal insulation so that there are no problems in connection with such signalling conductors.

The interrogation unit only has to irradiate a magnetic field into the pipe by means of its exciter coil; the frequency thereof can advantageously be matched to the resonance frequency of the induction coil in the sensor unit or can also be a multiple thereof. To produce a predetermined resonance frequency, a possibly adjustable capacitor can be connected in parallel relationship with the induction coil in the sensor unit. Due to the resonance between the magnetic field which is radiated by the interrogation unit, and the induction coil in the sensor unit, energy is taken from the radiated magnetic field. That fact can be detected in the transmitter and used to locate the sensor unit.

A substantially higher degree of sensitivity, with additional advantages, can be achieved if, in accordance with a development of the invention, the sensor unit has an electronic evaluation unit connected to the induction coil, with a memory and an associated writing and reading circuit. The switching arrangement is then connected to the evaluation unit and the interrogation unit has a programmable control unit. Then, both transmission energy for the sensor unit and also interrogation and programming signals are transmitted by way of the induction coil of the interrogation unit. The sensor unit then again does not require its own current source. Besides, an item of information which reproduces the status of the switching apparatus, an identification number which reproduces the respective sensor unit and thus the location thereof can be inputted into the memory of the sensor unit, in advance or also subsequently. It is also possible for further items of information to be stored in the memory, for example, the distance and the direction to the next sensor. Upon interrogation by means of the portable interrogation unit, energy is then firstly supplied to the sensor unit. That can then actively emit its memory content, for example, in the form of encoded pulses or also by modulation of a carrier signal. The items of information are then detected by the receiving coil of the interrogation unit and passed by the receiver to the programmable control unit and then displayed. In that connection, the programmable control unit can be in the form of a portable computer (laptop).

The use of an apparatus according to the invention is particularly desirable for pipelines which are composed of a multiplicity of pipe portions and each subdivided into sealed-off sections by a bulkhead or partition wall provided at one end of each pipe portion, between the medium-bearing pipe and the protective pipe. In the event of a leak occurring, the wetting effect can then be restricted to one or a maximum of two pipe portions, even if the leak is not repaired immediately. When such a subdivision arrangement is used, it is not possible to use signalling conductors as they would represent perforations through the bulkhead or partition wall arrangements. A contact-less sensor unit in accordance with the present invention avoids such weak points. In that respect, it is then provided that a respective sensor unit is arranged in each section in the region of a socket or sleeve for connecting two pipe portions.

The induction coil of each sensor unit is desirably so arranged in the twelve o'clock position on the inside of the protective pipe that its magnetic axis is disposed vertically. A maximum coupling effect can then be achieved between the coil in the sensor unit and the coil in the interrogation unit, and therewith good energy and signal transmission. The induction coil itself is desirably a flat coil.

The switching arrangement can be a thermal switch which responds at a predetermined temperature, for example, a thermostat or a thermal safety cut-out. The switching arrangement can also be embodied in the form of a switch which is urged by a spring into a switching condition, wherein the switch is held in the opposite switching conditon by a device which is triggered when wetting occurs. Desirably, the switch is a reed switch and the device which is triggered when wetting occurs includes an actuating solenoid which is urged by the spring into a first position causing the reed switch to respond. The solenoid is held against the action of the spring in a second position of not influencing the reed switch, by a device which becomes ineffective when wetting occurs. In the simplest case, the device which becomes ineffective when wetting occurs can be a tablet of water-soluble powder in which is embedded a thread which holds the solenoid in the second position against the force of the spring.

The switch is advantageously arranged in a housing which is not completely sealed off and which is at least partially filled with a moisture-attracting material, for example, silica gel. That prevents the moisture which is present after the pipes have been laid from already resulting in the switch being triggered off.

Figure 2:
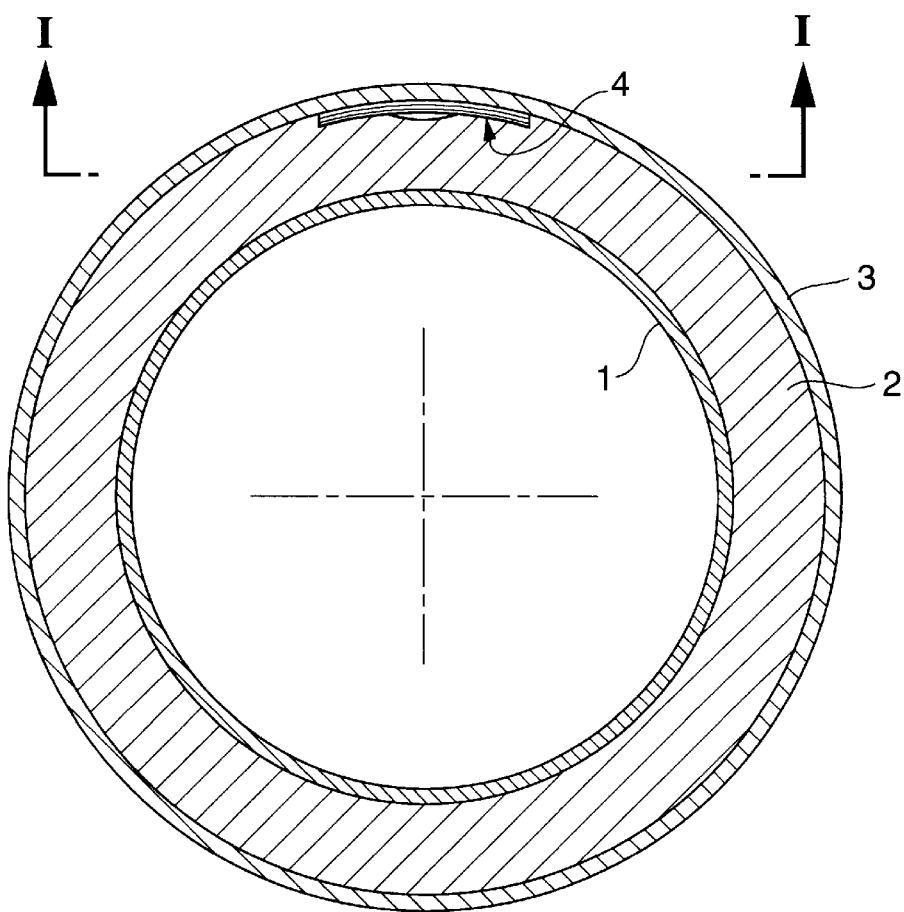
Figure 3:
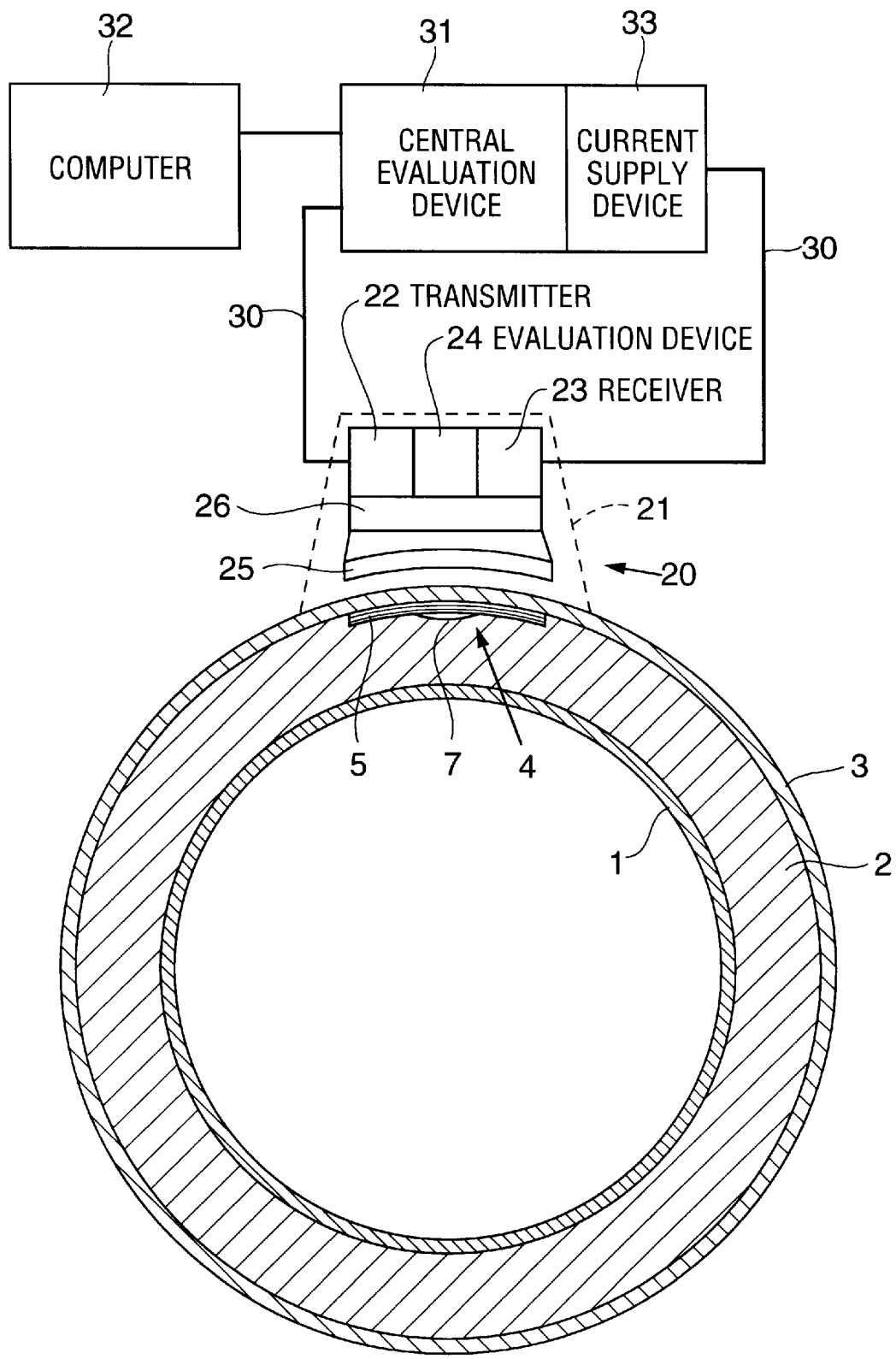

Embodiments of the invention are described hereinafter with reference to the drawing in which:

FIG. 1 is an inside view of the protective pipe with a transmitting unit corresponding to I—I in FIG. 2, FIG. 2 is a view in cross-section through a pipeline in the region of a sleeve, and FIG. 3 shows a circuit diagram with a further pipe cross-section and with circuit components.

The cross-sectional view illustrated in FIG. 2 shows a pipeline with a medium-carrying pipe 1 (e.g., a hot water or steam carrying pipe) of for example steel, a heat-insulating layer 2 of polyurethane foam, which follows the pipe 1, and an outer protective pipe 3 of polyethylene. A sensor unit 4 is arranged, for example, by gluing, on the inside wall of the protective pipe 3, at the twelve o'clock position. The sensor unit 4 has an induction coil connected to an electronic evaluation unit 6. The evaluation unit 6 also includes a switching arrangement which switches in dependence on temperature or moisture. The sensor unit 4 is disposed in the region of a sleeve or socket connection at the end of the protective pipe and is later foamed in position after the medium-bearing pipes 1 have been welded together, when the connecting sleeve or socket is given its post-insulation by foaming thereon.

The sensor unit 4 does not need to include any active components and can therefore be incorporated in the pipe even at really high foam temperatures of over 150° C.

FIG. 3 shows an embodiment of the invention with an interrogation device 20 which is arranged outside the protective pipe 3, in line with the sensor unit 4. The interrogation device 20, is desirably disposed in an encapsulating housing 21 which is adapted to the curvature of the pipe and which is secured to the outer protective pipe 3, for example, by welding or by means of adhesive tape. The interrogation device 20 includes an electronic device with a transmitter 22, a receiver 23, and an evaluation portion 24, a frequency generator 26, and an exciter coil 25 corresponding to the induction coil 5. The frequency generator 26 can be formed by a free-running LC-oscillator or by a tunable oscillator and is connected to the exciter coil 25 by way of lines. The interrogation device 20 is connected by way of a connecting cable 30 to a central evaluation device 31 to which a personal computer 32 is in turn connected. Corresponding to the plurality of sensors 4, there is a plurality of interrogation devices 20 which are connected to each other and to the central evaluation portion 31 by way of the cable 30. The cable 30 is also connected to a current supply device 33 in order to provide the power required for the frequency generators 26. When long line lengths are involved, it is possible to provide a plurality of current supply portions 33 in order to guarantee the power supply for the system.

In an embodiment, the sensor 4 consisted of a commercially available moisture and/or temperature sensor 7 which changes its capacitance under the effect of moisture and/or temperature and an induction coil 5 with about one hundred turns and of a diameter of about ten cm. The moisture sensor represents a capacitor which is connected to the induction coil 5 to form a resonating circuit.

Instead of commercially available moisture sensors, it is also possible to use two metal strips with interposed dielectric in foam form to constitute a capacitor. It is also possible to use other devices for forming a resonating circuit with the induction coil 5, which change with the state to be measured. As stated hereinbefore, temperature can also be measured, besides moisture. Sensor 7 can also be a sensor that takes the form of (i) a switching arrangement which upon or after its actuation writes a corresponding item of information into a memory, (ii) a thermal switch which responds at a predetermined temperature, or (iii) a sensor that includes a moisture-dependent capacitor.

Operation of the apparatus is as follows:

Address signals are emitted by the central portion 31 at given time intervals by way of the connecting cable 30 acting as a bus, with the receiver 23 addressing a given interrogation device 20 and switching on the frequency generator 26 which supplies the exciter coil 25 with an excitation signal of variable frequency. The exciter coil 25 is operable to build up an electromagnetic field which excites the induction coil 5, wherein the transmission of energy at resonance frequency reaches a maximum, as can be detected by the evaluation portion 24. A data signal in that respect is communicated by way of that resonance frequency to the central unit 31, by way of the transmitting portion 22. That data signal may be the divided-down resonance frequency.

As stated, the induction coil 5 and the moisture sensor 7 form a resonating circuit whose resonance frequency depends on the moisture that the moisture sensor 7 detects. Accordingly, the resonance frequency also depends on the detected moisture. The dependency as between moisture and resonance frequency is previously empirically ascertained and inputted in tabular form into the computer 32.

The central unit 31 successively actuates the individual interrogation devices 20 and collects data which are made available to the PC 32. The collective data are compared to predetermined data which, for example, can represent alarm thresholds, and displayed. The data with their comparison values can also be statistically evaluated and, for example, subjected to further processing with table calculation programs.

While the described system operates with moisture sensors, it is also possible to monitor other physical parameters, for example temperature, if suitable temperature detectors are installed instead of the moisture sensor 7.

What is claimed is:

1. A pipeline with apparatus for status detection, in particular leak detection, comprising:

an inner medium-carrying pipe (1) for the transportation of a medium, a heat-insulating layer (2), and an outer protective pipe (3), at least one sensor (4), which includes a sensor device (7) responsive to at least one of moisture level and temperature level, and an induction coil (5) arranged in the region of the heat-insulating layer (2);

the sensor device (7) and the induction coil (5) form a resonating circuit whose resonance properties depend on the state of the sensor device (7) as a result of the conditions (moisture, temperature) prevailing in the heat-insulating layer; and an interrogation device (20) which includes a frequency generator (26), an exciter coil (25), and an evaluation device (24) and can be brought into a position near the sensor (4) to feed electromagnetic radiation thereto, the resonance properties of the sensor resonating circuit being detected.

2. The pipeline with a status detection apparatus as set forth in claim 1, and further comprising:

a plurality of medium-carrying pipes (1);

heat-insulating layers (2) and protective pipes (3) laid to form at least one pipeline run which has a plurality of sensors (4);

a plurality of interrogation devices (20) which are connected to each other and to a central evaluation device (31) by way of cables (30);

each interrogation device 20 has transmitting and receiving devices (22, 23) and memories for an additional address;

the central evaluation device (31) has means for emitting individual addresses of the interrogation devices (20);

the address receiving device (23) of the addressed interrogation device (20) is capable of activating the frequency generator (26) in order to feed an excitation signal of variable frequency to the exciter coil (25) of the interrogation device in question; and the evaluation device (24) of the interrogation device (20) in question is adapted to respond to resonance between the excitation coil and the induction coil (5) and to activate the transmitting device (22).

3. The pipeline with status detection apparatus as set forth in claim 2, further comprising a storage and processing device (32) connected to the central evaluation device (31).

4. The pipeline with status detection apparatus as set forth in claim 3, wherein the storage and processing device (32) has comparison devices for comparing data supplied by the central evaluation device (31) to alarm thresholds.

5. The pipeline with status detection apparatus as set forth in claim 1, wherein the pipeline is composed of a plurality of pipes and is subdivided into sealed-off sections by a partition wall provided at an end of each pipe between the medium-carrying pipe (1) and the protective pipe (3), and wherein a respective sensor unit (4) is arranged in each section in the region of a sleeve for the connection of two pipes.

6. The pipeline with status detection apparatus as set forth in claim 1, characterized in that the induction coil (5) of each sensor unit (4) is so arranged on the inside of the protective pipe (3) in the twelve o'clock position that its magnetic axis is vertical.

7. Apparatus for status detection of moisture and/or temperature in the heat-insulating layer of a pipeline, comprising:

a sensor device (7) adapted to respond to at least one of moisture level and temperature level and in that situation changes its electrical property;

an induction coil (5) connected together with the sensor device (7) to form an electrical resonating circuit whose resonance properties depend on the electrical property of the sensor device (7);

the sensor device (7) and the induction coil (5) form a sensor (4) which is adapted to co-operate with an interrogation device (20) for the condition of the sensor; and the interrogation device (20) includes a frequency generator (26), an exciter coil (25), and an evaluation device (24) in order by irradiation of electromagnetic energy to detect the resonance properties of the sensor resonating circuit.

8. The apparatus as set forth in claim 7, characterized in that the induction coil is a flat coil (5).

9. The apparatus as set forth in claim 7, characterized in that associated with each sensor (4) is a memory with a number identifying the respective sensor unit.

10. The apparatus as set forth in claim 9, characterized in that the sensor device is in the form of a switching arrangement which upon or after actuation thereof writes a corresponding item of information into the memory.

11. The apparatus as set forth in claim 7, characterized in that the sensor device is a thermal switch which responds at a predetermined temperature.

12. The apparatus as set forth in claim 7, characterized in that the sensor device (7) includes a moisture-dependent capacitor.

13. The apparatus as set forth in claim 7, characterized in that the interrogation device (20) has a portable computer as the programmable control unit.

* * * * *